Oct. 29, 1963     E. E. HIEBER     3,108,769
RING WING DROGUE
Filed Sept. 18, 1961     2 Sheets-Sheet 2
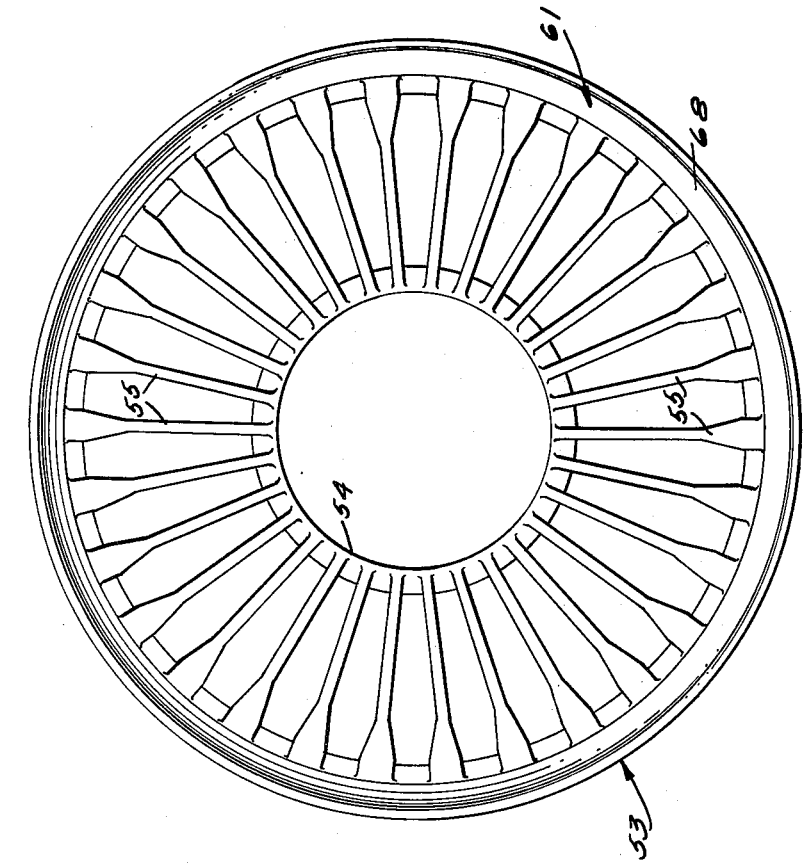
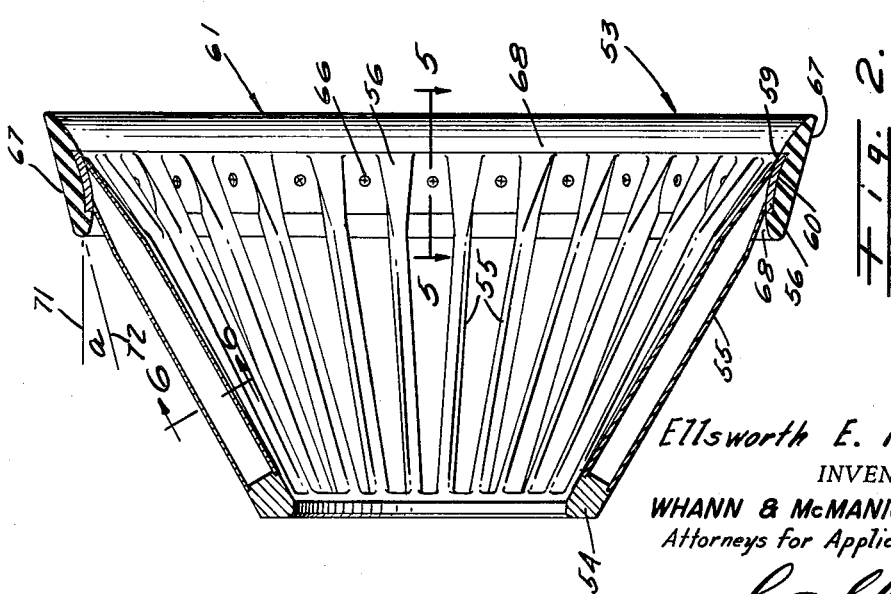
Ellsworth E. Hieber,
INVENTOR.
WHANN & McMANIGAL
Attorneys for Applicant

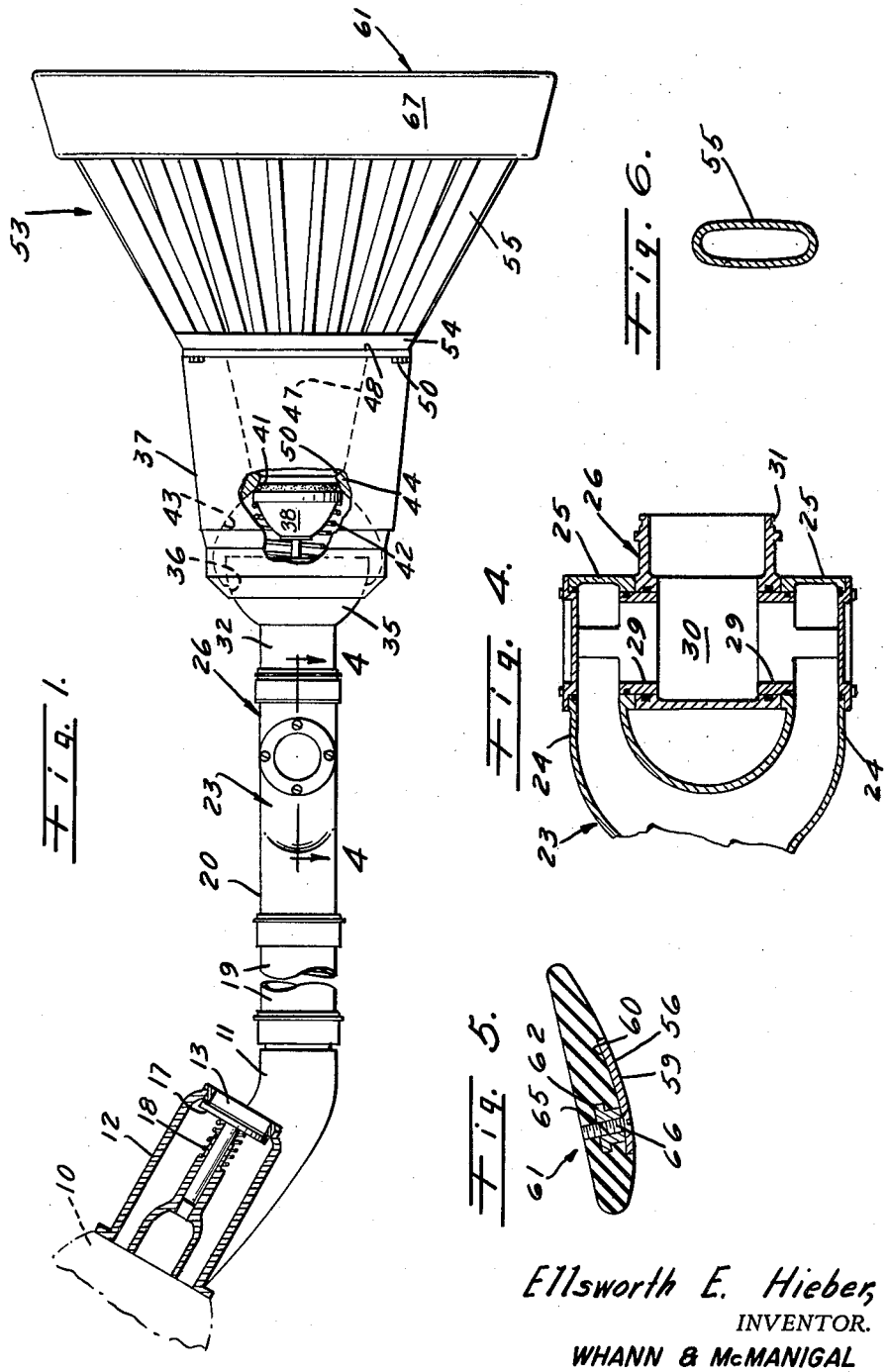

United States Patent Office 3,108,769
Patented Oct. 29, 1963

3,108,769
RING WING DROGUE
Ellsworth E. Hieber, Glendale, Calif., assignor to Schulz Tool and Manufacturing Co., San Gabriel, Calif., a corporation of California
Filed Sept. 18, 1961, Ser. No. 138,714
10 Claims. (Cl. 244—135)

This invention relates to an in-flight fueling assembly and, more particularly, to a ring wing drogue.

In in-flight fueling operations, there exists the problem of maintaining a drogue, connected to a flexible hose, in a stable position. In addition, there is a further requirement of providing a drogue so that if it is tippled, for example, by the probe making contact along its outer periphery, the drogue will quickly return to its stabilized condition where the center line of the drogue is in line with the relative wind. Thus, if the center line is deflected from its alignment with the relative wind by some disturbance, the drogue should be made so that forces can act upon it to quickly return it to its neutral position.

It is thus an object of the present invention to provide an improved drogue.

It is another object of the present invention to provide an improved in-flight fueling assembly including a drogue.

It is still another object of the present invention to provide a more stable drogue.

It is a further object of the present invention to provide a drogue which, when deflected from its normal operating position where the center line of the drogue is in alignment with the relative wind, will be acted upon by strong aerodynamic forces to return the drogue to its neutral position where it will be aerodynamically stable.

It is a still further object of the present invention to provide a drogue that is aerodynamically stable when its center line is in alignment with the relative wind and which has a configuration so that when it is deflected from its neutral position the normal aerodynamic forces acting upon it will return it to the latter position.

It is another object of the present invention to provide a drogue which when caused to be tippled at one portion thereof, greater surface is acted upon by the air stream to restore it to its neutral position, and on a diametrically opposite portion thereof less surface is presented to the air stream so that the forces acting thereon will be less, thus, causing the drogue to return to its neutral position more rapidly.

It is a further object of the present invention to provide a drogue having a rigid aerodynamic structure with a resilient contacting surface for a mating probe.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes only:

FIG. 1 is a side elevational view of the delivering portion of an in-flight fueling assembly including a drogue;

FIG. 2 is a cross sectional view of a ring wing drogue according to the invention;

FIG. 3 is a view of the large diameter end of the drogue shown in FIGS. 1 and 2;

FIG. 4 is a cross sectional view of a Y-shaped trunnion of the fueling assembly, taken as indicated by line 4—4 in FIG. 1;

FIG. 5 is a fragmentary cross sectional view of the ring wing, taken as indicated along the line 5—5 of FIG. 2; and FIG. 6 is a cross sectional view of a drogue strut, taken as indicated along the line 6—6 of FIG. 2.

Referring again to the drawings, there is shown in FIG. 1 an in-flight fueling assembly adapted to be secured to a tanker aircraft refueling boom, indicated in phantom lines at 10. The in-flight fueling assembly is comprised of a combination fitting which is secured to the boom 10 and which includes a fuel flow pipe 11 and a combination tanker filling or dump valve 12. The valve 12 has an opening 13 which is normally closed by a spring held valve disk 17, the spring being indicated at 18. This valve is adapted to receive a filling nozzle in the opening 13 which would force the valve disk off its seat, or it may be operated by means, not shown, within the plane to dump fuel on the lifting of disk 17 from its seat.

Sealingly attached to fitting 11 is a flexible hose 19 from which extends a pipe fitting 20 having a Y-shaped trunnion 23. The trunnion 23 is comprised of two Y-flow passage members 24 with closed ends 25. Rotatably engaged with and between the two Y-members is a T-fitting 26 which has its T-cross bar portion 29 rotatably and sealingly engaged with the ends 25 of the Y-member to form a flow passage 30 in the leg 31 of the T. Thus, the member 26 is pivotable in ends 25 with respect to the pipe 20.

Extending from and sealingly secured to the leg 31 is a fitting 32 having on its end opposite the latter, a ball 35 sealingly and rotatably engaged in a socket 36 of a probe reception coupling 37 to form a ball and socket joint. Within the reception coupling 37 is a poppet valve 38 normally held closed on its seat 41 on ring 44 by a spring 42, having its end away from the valve in abutment with an unshown web member extending radially inwardly from inner wall 43 of the reception coupling. The inner wall 43 forms a flow passage connected to fitting 32 and which extends through the ball 35.

Forward of the ring 44 is an inner wall 47, the walls 43 and 47 terminating in the latter ring. The wall 47 provides a tapered opening extending inwardly from outer end 48 of the reception coupling, and is adapted to receive a probe on an airplane to be fueled, the probe upon entering the opening defined by wall 47 being designed to force valve 38 off its seat and then seat on probe seat 49 formed on an outer portion of ring 44.

Secured to end 48 of reception coupling 37 by means of bolts 50 is a cone-shaped drogue 53 adapted to guide the aforesaid fueling probe into the opening defined by the wall 47. As may be best seen in FIGS. 2 and 3, the drogue 53 is comprised of an inner rung 54, as shown in FIG. 1, to be secured directly to end 48 of the reception coupling. Spaced around the outer portion of ring 54 are elliptical-shaped struts 55, shown in cross section in FIG. 6. The struts are secured to the ring 54, as by welding, and are arranged to form a truncated cone configuration to guide probes.

Secured to the outer end of struts 55, as by welding, is a support ring 56, having in cross section a convex inner surface 59 and a concave outer surface 60. As may be best seen in FIGS. 2 and 5, secured to support ring 56 is a rubber ring wing 61, having the cross section of an aircraft wing. Circumferentially spaced and bonded within ring wing 61 are T-shaped inserts 62 having a threaded opening 65 in which screws 66, extending through ring 56, are threadedly engaged to secure the ring wing to the drogue.

The outer face 67 of ring wing 61 is tapered relative to the axis of the cone of the drogue and has the appearance of a truncated cone, as best seen in FIG. 1. The inner surface 68 is approximately semi-elliptical in cross section, similar to that of the upper surface of an airplane wing. The ring 61 is made of rubber or other elastomeric material to provide a resilient surface for contact with the probe and thereby reduce or avoid damage to the various parts of the assembly and to the probe, or damage to the receiver aircraft through inadvertent contact during the refueling operation.

If the assembly shown in FIG. 1 were permitted to extend outwardly from the aircraft when it is not in flight, that portion thereof extending to the right of flexible hose 19 would hang directly downwardly, the hose 19 being bent by the weight of the structure secured thereto. However, when the aircraft is in flight and the drogue assembly is extended from the aircraft, the air stream through the drogue cone passing through the struts 55 and around the ring wing 61, causes the drogue assembly to extend horizontally rearwardly outwardly, as shown in FIG. 1. Frequently, as an aircraft to be fueled approaches the opening formed by ring wing 61, the probe makes contact with a surface of the ring 61 so as to cause the drogue 53 and the reception coupling 37 to tipple and to rotate on the ball 35. If the force of the probe is great enough, it will further cause the pipe 26 to pivot in the Y-trunnion 23, sometimes causing the drogue to be moved out of range of the probe so that another approach has to be made.

However, many times the tippling of the drogue by the probe is only a small amount limited, for example, to movement on the ball 35 in its socket. On such occasions the probe will generally enter the drogue cone so as to make fueling contact within the reception coupling. In accordance with the present invention, the entry of the probe into the reception coupling is greatly enhanced even though the probe causes the drogue to tipple in that the air stream rapidly brings the drogue by means of the ring wing 61 back to its neutral position. That is, when the drogue commences to tipple on the ball 35, the angle of attack "a" is increased. The angle of attack is shown in FIG. 2 as being formed between the line 71, which is in the direction of the relative air stream, and the line 72 which is the general direction of the air foil formed by the ring wing and generally parallel to its outer surface 67. Thus, if the probe makes contact with the upper portion of the ring wing, shown in FIG. 2, the drogue is tippled upwards increasing the angle of attack or deflection "a" so as to greatly increase the exposed surface of the upper part of the ring wing in FIG. 2 and the lift and drag forces acting thereon. As may be understood by imagining the same upward tippling on the lower part of the ring wing in FIG. 2, on that part of the ring the lift and drag become less in that the surface 67 of the ring tends to become parallel to the relative air stream causing less surface to be acted upon by the latter. The result of the greater forces acting upon the greater surface is to quickly force the ring wing and the drogue attached thereto back to its neutral position in which its center line is in alignment with the relative wind, the latter position being the normal position of the center line of the ring wing drogue where it is held by the normal drag force.

It has been found that strong aerodynamic forces are developed on the ring wing which tend to return the drogue to its neutral position and thereby make the drogue aerodynamically stable. The primary force involved for returning the drogue to neutral position is lift acting perpendicular to the relative wind. A measure of the aerodynamic stability of such a system is the slope of the lift curve and it has been found that the present ring wing configuration has a lift curve slope twice that of a conventional wing of identical planiform. Thus, the ring wing configuration possesses a high degree of stability which it provides for the drogue assembly to which it is secured.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A cone for use in an air stream: said cone being truncated and formed by peripherally spaced struts extending between a small diameter ring at its small diameter end and a large diameter ring at the other end of said cone; and fixed conical means on the external surface of said large diameter ring to respond to an air stream to position the axis of said cone in the direction of said air stream when said cone is tippled.

2. A drogue for use in a probe and drogue in-flight fueling system: a reception coupling; and a strut-formed, rigid truncated cone having its small diameter end secured to said coupling, said cone being formed by peripherally spaced struts extending between a small diameter ring at said last end and a large diameter ring at the other end of said cone, said large diameter ring having a conical external surface enlarging in diameter toward said other end so as to respond to an air stream to position the axis of said cone in the direction of said air stream when said cone is tippled.

3. A drogue for use in a probe and drogue in-flight fueling system: a reception coupling; and a strut-formed truncated cone having its small diameter end secured to said coupling, said cone being formed by peripherally spaced struts extending between a small diameter ring at said last end and a large diameter ring at the other end of said cone, said large diameter ring having a wing-shaped cross section so as to respond to an air stream to position the axis of said cone in the direction of said air stream when said cone is tippled by a probe, the external circumferential surface of said large diameter ring being conical.

4. A cone for use in an air stream: said cone being formed by peripherally spaced struts extending end to end; and a large diameter ring at the base of said cone, said ring having a wing-shaped cross section, the outer face of said ring being a conical surface and the inner face being a convex surface.

5. A drogue for use in a probe and drogue in-flight fueling system: a reception coupling; and a strut-formed truncated cone having its small diameter end secured to said coupling, said cone being formed by peripherally spaced struts extending between a small diameter ring at said last end and a large diameter ring at the other end of said cone, said large diameter ring having a wing-shaped cross section, the outer face of said last ring being a conical surface increasing in diameter in the direction away from said cone and the inner surface of said last ring being a convex surface elliptical in cross section extending between the ends of said conical surface.

6. A drogue for use in a probe and drogue in-flight fueling system: a reception coupling; and a strut-formed truncated cone having its small diameter end secured to said coupling, said cone being formed by peripherally spaced struts extending between a small diameter ring at said last end and a large diameter ring at the other end of said cone, said large diameter ring having a wing-shaped cross section, the outer face of said last ring being a conical surface increasing in diameter in the direction away from said cone and the inner surface of said last ring being a convex surface elliptical in cross section extending between the ends of said conical surface, said struts being joined to said large diameter ring in a spaced relationship around the inner periphery formed by said convex surface at the innermost part thereof, said struts having a substantially elliptical cross section with the long diameter radially directed.

7. A drogue fueling assembly comprising: a fitting for connecting said assembly to a drogue boom on an aircraft; a flexible hose attached to said fitting; a Y-trunnion attached to said hose; a rotatable joint extending between the upper portions of the Y of the trunion; flow passages through said trunnion to said rotatable joint, said rotatable joint being connected to a ball of a ball and socket joint; a reception coupling having said ball therein adjacent one end thereof, said ball being rotatably and sealingly engaged in a socket in said coupling; a rigid truncated cone having its small diameter end secured to the other end of said coupling; and fixed conical means forming an external portion on the large diameter end of said cone to respond to an air stream to position the axis of said cone in the direction of said air stream when said cone is tippled.

8. A drogue fueling assembly comprising: a fitting for connecting said assembly to a drogue boom on an aircraft; a flexible hose attached to said fitting; a Y-trunnion attached to said hose; a rotatable joint extending between the upper portions of the Y of the trunnion; flow passages through said trunnion to said rotatable joint, said rotatable joint being connected to a ball of a ball and socket joint; a reception coupling having said ball therein adjacent one end thereof, said ball being rotatably and sealingly engaged in a socket in said coupling; and a strut-formed truncated cone having its small diameter end secured to the other end of said coupling, said cone being formed by peripherally spaced struts extending between a small diameter ring at said last end and a large diameter ring at the outer end of said cone, said large diameter ring having a wing-shaped cross section, the outer face of said last ring being a conical surface and the inner face being a convex surface.

9. A drogue fueling assembly comprising: a fitting for connecting said assembly to a drogue boom on an aircraft; a flexible hose attached to said fitting; a Y-trunnion attached to said hose; a rotatable joint extending between the upper portions of the Y of the trunnion; flow passages through said trunnion to said rotatable joint, said rotatable joint being connected to a ball of a ball and socket joint; a reception coupling having said ball therein adjacent one end thereof; said ball being rotatably and sealingly engaged in a socket in said coupling; a pressure closed valve attached to said fitting and forming an opening therein when said valve is opened; and a strut-formed truncated cone having its small diameter end secured to the other end of said coupling, said cone being formed by peripherally spaced struts extending between a small diameter ring at said last end and a large diameter ring at the outer end of said cone, said large diameter ring having a wing-shaped cross section, the outer face of said last ring being a conical surface increasing in diameter in the direction away from said cone and the inner surface being a convex surface elliptical in cross section extending between the ends of said conical surface.

10. The invention according to claim 8 in which said reception coupling has a pressure closed valve openable from the exterior thereof by means of a probe entering said cone and said coupling.

References Cited in the file of this patent

UNITED STATES PATENTS

| | | |
|---|---|---|
| 2,582,609 | Steele | Jan. 15, 1952 |
| 2,879,016 | Haase | Mar. 24, 1959 |
| 2,946,543 | Gordon | July 26, 1960 |
| 2,953,332 | Cobham | Sept. 20, 1960 |

FOREIGN PATENTS

| | | |
|---|---|---|
| 1,158,452 | France | Jan. 27, 1958 |